Sept. 18, 1928.

H. T. SCOTT

REAR SIGHT MIRROR

Filed April 28, 1926

1,684,560

INVENTOR.
HARRY T. SCOTT,
By: Otto H. Ringer,
his Atty.

Patented Sept. 18, 1928.

1,684,560

UNITED STATES PATENT OFFICE.

HARRY T. SCOTT, OF LOS ANGELES, CALIFORNIA.

REAR-SIGHT MIRROR.

Application filed April 28, 1926. Serial No. 105,181.

This invention relates to devices used for displaying to the driver of a vehicle, any occurrences behind him and around him while driving.

One of the objects of this invention is to produce a device so designed that it may be attached to the door of an inclosed automobile.

Another object is to provide a device of especially thin structure to fit into the narrow space left on inclosed cars with wind wings attached to the sides of the wind shield of the automobile.

Another object is to provide a device with pivoting means in a narrow frame structure for swinging movements in a principally vertical plane, having other pivot interconnection between the frame structure and the mirror proper, to allow a swinging of the mirror proper in a generally horizontal plane.

Another object is to provide especially light but rigid structures for the frame as well as for the mirror proper.

Other objects will appear from the following description and appended claims as well as from the accompanying drawing, in which—

Figure 1:
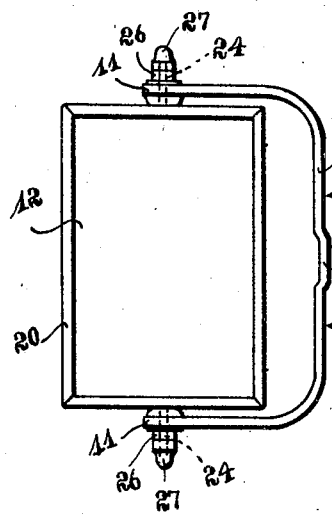
Fig. 1 is a side elevation of the complete mirror structure, including frame and mirror proper, of a simple form embodying this invention.
Figure 8:
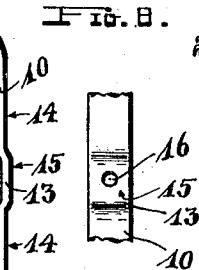
Fig. 8 is a fragmentary end elevation of the supporting frame of Fig. 1, as seen at right angles to the illustration of Fig. 1.

As illustrated in Figs. 1 and 8, the supporting frame 10 is made of thin flat material, bent in U-form having perforated apertured terminations 11 for pivotally supporting the mirror proper, indicated at 12. The central portion 13 of this supporting frame is formed to provide a bearing surface of comparatively small dimensions, in order to avoid or eliminate unnecessary or excessive scratching or marring of the surfaces to which this device may be attached, as the surface of an automobile door, or the sides of the frame structure of the automobile. The larger portions of the frame 10 are set back from the bearing and wearing surface 15 of this supporting frame, as indicated at 14, so that the supporting frame 10 may be swung and adjusted around the point of pivoting at 16 without a touching of the larger portions of this supporting frame on the surface to which the central portion 13 is attached.

Figure 2:
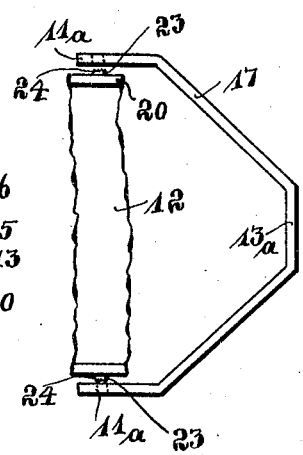
Fig. 2 is a side elevation of a slightly modified form of frame structure, indicating the mirror proper in a fragmentary manner.
Figure 9:
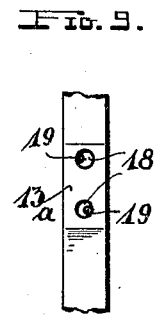
Fig. 9 is a fragmentary end elevation of the supporting frame of Fig. 2, seen at right angles.
Figure 3:
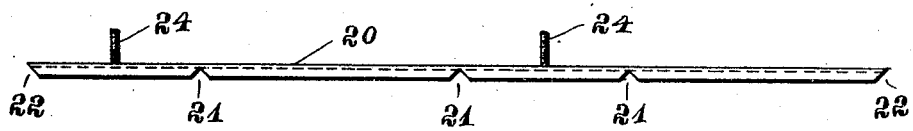
Fig. 3 is a detail side elevation of the frame for the mirror proper, in stretched condition before the frame is bent to inclose the glass and other parts of the mirror proper.

The slightly modified form of Figs. 2 and 9 illustrate the supporting frame $10_a$ provided with portions 17 slanting directly from the apertured terminations $11_a$ to the narrow central portion $13_a$, requiring somewhat less bending than the form of Figs. 1 and 8, though the mirror proper must, of course, also be cut off at the corners, or a mirror of not strictly a rectangular form is preferably used in such a slightly modified form of supporting frame. The pivot holes 18, of which a pair are indicated in this form, are preferably as large as possible in order to allow a suitable setting in relation to comparatively small securing screws or pins 19. The main supporting frame requires, as a rule, very little adjustment, so that the adjustment with large holes over smaller screws is fully sufficient.

Figure 4:
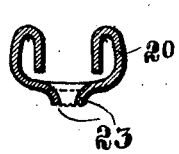
Fig. 4 is an enlarged general cross section through the frame for the mirror proper, illustrating the punching and burring for the connecting bolts.
Figure 7:
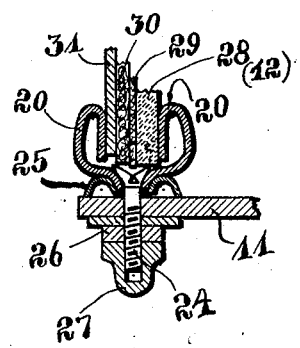
Fig. 7 is a fragmentary cross section through the interconnection by the bolt between the supporting frame and the mirror frame.

The mirror frame 20 is made of special light material, of a cross section illustrated in Figs. 4 and 7. Whether the mirror or reflector is made of rectangular form or of any other shape, this mirror frame is preferably cut from a single bar, and notched, as indicated at 21, and cut off as indicated at 22, to produce a smooth evenly joining appearance in the completed structure, when bent at such notched points. For round or oval mirrors, the frame is, of course, merely bent to in a suitable manner to complete such a shape without notching.

Figure 5:
Fig. 5 is a fragmentary side elevation of a connecting bolt disposed in the burred hole of the mirror frame, and illustrating also the forming of the bolt-head for holding the bolt against turning.
Figure 6:
Fig. 6 is a top plan view of the bolt head, to illustrate the means by which the bolt is held against turning.

At the points of pivoting, the frame is punched and burred as illustrated in Fig. 4, so that no material is cut out or lost, and the burred material is even used for bearing purposes. The screw 24, used for the pivot in this frame, is forced into the burred hole 23 of the frame by means of a special tool, whereby the head of the screw is practically deformed, so to say, but in fact formed to especially make this screw useful so as to be held against turning by the very fact of being so formed. As illustrated in Figs. 5 and 6, the grooved head of the screw, by being forced into the burred hole of the frame, is deformed to such an extent that the screw cannot turn, especially after the glass and other parts are inserted in the mirror-frame 20, so that the screw is then held in the unround or correspondingly shaped hole in the frame, since the screw had been forced in, to make the burred hole correspond to the shape taken by the screw on being forced into the frame hole.

A cupped washer 25 is inserted between the mirror-frame 20 and the apertured end 11 of the main supporting frame 10, and the screw 24 with the mirror-frame 20 are held locked in desired positions in relation to the main supporting frame 10 by the nuts 26 and 27.

The glass or reflector 28 is backed by an oiled paper 29, to protect the rear side of the reflector, and a cushioning means 30 is inserted between the oiled paper and the sheet-metal back 31.

Having thus described my invention, I claim:

1. In a rear and side view mirror for inclosed cars, in combination with a punched and burred reflector-frame, pivots each made of a screw with the grooved head folded on the plane of the slot until the top horizontal edges of the slot meet adapted to be held within the correspondingly formed punched and burred portions of the said frame against turning.

2. In a rear and side view mirror for inclosed cars, a reflector, a frame formed around the reflector and made of light material and having punched and burred bearing portions, pivots made of screws with the grooved heads folded on the plane of the slot until the top horizontal edges of the slot meet seated in the bearing portions and held against turning, the said bearing portions having shapes to seat the folded screw heads, a supporting frame having apertured ends to engage the pivots, cup-washers disposed over the burred portions of the reflector-frame and between the reflector-frame and the supporting frame, and locking means for drawing and holding the said bearing portions of the reflector-frame into the said washers and against the supporting frame.

In testimony that I claim the foregoing as my invention I have signed my name.

HARRY T. SCOTT.